United States Patent [19]
Chittofrati et al.

[11] Patent Number: 5,942,572
[45] Date of Patent: Aug. 24, 1999

[54] AQUEOUS LATEXES BASED ON FLUOROPOLYMERS

[75] Inventors: Alba Chittofrati, Milan; Paolo Lazzari, Mandello Lario; Daria Lenti, Valenza Po, all of Italy

[73] Assignee: Ausimont S.p.A., Milan, Italy

[21] Appl. No.: 08/888,701

[22] Filed: Jul. 7, 1997

[30] Foreign Application Priority Data

Jul. 9, 1996 [IT] Italy .................. MI96A01412

[51] Int. Cl.$^6$ ................... C08L 27/18; B01F 17/00; C08F 216/12; C08F 214/18
[52] U.S. Cl. ............... 524/805; 524/463; 528/401; 252/351; 526/247; 526/248; 526/249
[58] Field of Search ................... 524/463, 805; 528/401; 252/351; 526/247, 248, 249

[56] References Cited

U.S. PATENT DOCUMENTS

| | | |
|---|---|---|
| 3,242,218 | 3/1966 | Miller . |
| 3,665,041 | 5/1972 | Sianesi et al. . |
| 3,715,378 | 2/1973 | Sianesi et al. . |
| 4,013,689 | 3/1977 | Martini . |
| 4,523,039 | 6/1985 | Lagow et al. . |
| 4,675,380 | 6/1987 | Buckmaster et al. . |
| 4,711,802 | 12/1987 | Tannenbaum ............... 428/207 |
| 4,864,006 | 9/1989 | Giannetti et al. . |
| 4,906,770 | 3/1990 | Marchionni et al. . |
| 5,144,092 | 9/1992 | Marraccini et al. . |
| 5,294,248 | 3/1994 | Chittofrati et al. ............ 524/463 |
| 5,672,767 | 9/1997 | Chambers et al. ............ 528/401 |
| 5,698,138 | 12/1997 | Visca et al. ................ 252/312 |

FOREIGN PATENT DOCUMENTS

| | | |
|---|---|---|
| A075312 | 3/1983 | European Pat. Off. . |
| A148482 | 7/1985 | European Pat. Off. . |
| A247379 | 12/1987 | European Pat. Off. . |
| 0 396 962 | 11/1990 | European Pat. Off. . |
| A633257 | 1/1995 | European Pat. Off. . |
| A633274 | 1/1995 | European Pat. Off. . |
| 0 818 490 | 1/1998 | European Pat. Off. . |
| 2075330 | 9/1971 | France . |
| 2132122 | 3/1972 | France . |
| 2204643 | 10/1973 | France . |
| 1104482 | 2/1968 | United Kingdom . |
| 1106344 | 3/1968 | United Kingdom . |

OTHER PUBLICATIONS

Nordic Pulp and Paper Research Journal No. Jan. 1993, pp. 188–190.
Th. F. Tadros et al; Langmuir 1995, 11, pp. 4678–4684.
Th. F. Tadros; Colloids and Surfaces, 18(1986), pp. 137–173.

*Primary Examiner*—Tae Yoon
*Attorney, Agent, or Firm*—Nikaido Marmelstein Murray & Oram, LLP

[57] ABSTRACT

Non-ionic compound having the general formula:

$$R_f\text{—L—}(OCHR_1\text{—}CHR_2)_n\text{—O—L'—}R_{f'} \quad (I)$$

wherein:

n is an integer comprised between 4 and 60, preferably between 8 and 30;

L and L', equal to or different from each other, can be selected from:

—$(CFY\text{—}CO\text{—}O)_pR'$— and —$(CFY\text{—}CO\text{—}NH)_pR'$— wherein: p is 0 or 1; Y can be F or $CF_3$; R' is an alkylic radical $C_1$–$C_5$, $R_1$, $R_2$ can be both H or the former one H and the latter $CH_3$.

$R_f$ and $R_{f'}$, equal to or different from each other, can be perfluoropolyethereal radicals having a number average molecular weight comprised between 250 and 1500, preferably between 400 and 1000; and its use as thickener of aqueous latexes based on fluoropolymers.

16 Claims, No Drawings

AQUEOUS LATEXES BASED ON FLUOROPOLYMERS

The present invention relates to aqueous latexes, based on fluoropolymers, having high viscosity.

More particularly, the present invention relates to aqueous latexes having high viscosity, based on fluoropolymers and in particular based on tetrafluoroethylene polymers or a copolymer thereof with other fluorinated ethylenically unsaturated monomers.

The tetrafluoroethylene polymers and its copolymers are well known and described for instance in EP-A-0 633,274 and in EP-A-0 633,257. Such polymers are prepared by radical polymerization in an aqueous medium with the obtainment of latexes having a concentration generally not higher than 50% by weight of solid.

Even though these latexes can be subjected to a further process of concentration, they have a low viscosity which limits the amount of material deposited in the applications as coating. Therefore, these latexes as such (non formulated) are not suitable to be used for the coating by immersion or spraying on metal surfaces or fabrics or, however, on vertical surfaces.

A viscosity increase of the latexes enhances the amount of polymer deposited (for instance by a single passage), and therefore to a greater protective effectiveness, even if a typical critical thickness exists for each material and formulation.

In order to increase the viscosity of the polymeric latexes, it is a common technique to add a thickening agent such as, for instance, silica, carboxymethylcellulose, starch, polyethylenimine, acrylic, polyacrylic or polymethacrylic acids (or their salts), polysaccharides, etc., as described in Nordic Pulp and Paper Research Journal No. 1/1993, pag. 188–190. These substances increase the water viscosity of the latexes but their surfactant activity or wetting effect is poor.

The viscosity control and wetting capacity of latexes is commonly obtained with formulations containing various additives, for instance inorganic salts combined with hydrocarbon or fluorinated surfactants and optionally conventional thickening agents.

The wetting of the substrate is not particularly critical with the conventional surfactants but it is critical in applications of fluorinated coatings where several deposition cycles are required and after the first cycle the latex must wet a fluorinated layer having low surface energy. For this reason, the latexes used for fluorinated coatings are additivated with both a thickening agent and a surface-active or wetting agent.

The use of two different chemical compounds of which the former has a thickening action and the latter a wetting effect, can imply problems of compatibility or synergies either among them or with the polymer particles dispersed in the latex.

An object of the present invention is to overcome the above drawbacks.

More particularly, an object of the present invention is supplying a compound having at the same time a thickening and a surface-active action and being perfectly compatible with the fluorinated polymer.

According to the present invention these and other objects resulting from the following description are obtained by using as a thickening and surface-active agent a non-ionic compound having the general formula:

$$R_f\text{—L—}(OCHR_1\text{—}CHR_2)_n\text{—O—L'—}R_{f'} \quad (I)$$

wherein:
n is an integer comprised between 40 and 60, preferably between 8 and 30;
L and L', equal to or different from each other, can be selected from:
—(CFY—CO—O)$_p$R'— and —(CFY—CO—NH)$_p$R'—
wherein:
p is 0 or 1; Y can be F or CF$_3$; R' is an alkyl radical C$_1$–C$_5$, R$_1$, R$_2$ can be both H, or one is H and the other CH$_3$.
R$_f$ and R$_{f'}$, equal to or different from each other, can be perfluoropolyether radicals having an average numerical molecular weight between 250 and 1500, preferably between 400 and 1000.

The perfluoropolyether radicals R$_f$ and R$_{f'}$ comprise a terminal T and repeating units statistically distributed along the polymer chain chosen among:
—CF$_2$CFXO— or —CFXO—, wherein X is equal to F or —CF$_3$;
—CF$_2$(CF$_2$)$_z$O— wherein z is an integer equal to 2 or 3;
—CF$_2$CF(OR$_f$'')O— or —CF(OR$_f$'')O— wherein R$_f$'' can be —CF$_3$,
—C$_2$F$_5$, or —C$_3$F$_7$.

The terminal T of the perfluoropolyether radical is selected among —CF$_3$, —C$_2$F$_5$, —C$_3$F$_7$, ClCF$_2$CF(CF$_3$)—, CF$_3$CFClCF$_2$—, ClCF$_2$CF$_2$— and ClCF$_2$—.

In particular, the following perfluoropolyether radicals R$_f$ and R$_{f'}$ can be mentioned as preferred:

(a) T—O (CF$_2$CF(CF$_3$)O)$_a$(CFXO)$_b$—
wherein: X is F or CF$_3$; a and b are integers such that the molecular weight is comprised in the range indicated above; a/b is comprised between 10 and 100, and T is one of the terminals mentioned above;

(b) T—O(CF$_2$CF$_2$O)$_c$(CF$_2$O)$_d$(CF$_2$(CF$_2$)$_z$CF$_2$O)$_h$—
wherein: c, d and h are integers such that the molecular weight is comprised in the range indicated above; c/d is comprised between 0.1 and 10; h/(c+d) is comprised between 0 and 0.05, z is an integer equal to 2 or 3, and T is one of the terminals mentioned above;

(c) T—O (CF$_2$CF (CF$_3$)O)$_e$(CF$_2$CF$_2$O)$_f$(CFXO)$_g$—
wherein: X is F or CF$_3$; e, f, g are integers such that the molecular weight is comprised in the range indicated above; e/(f+g) is comprised between 0.1 and 10, f/g is comprised between 2 and 10, T is one of the terminals indicated above;

(d) T—O(CF$_2$O)$_j$(CF$_2$CF(OR$_f$'')O)$_k$(CF(OR$_f$'')O)$_l$—
wherein: R$_f$'' is —CF$_3$, —C$_2$F$_5$, —C$_3$F$_7$; j,k,l are such integers that the molecular weight is comprised in the range indicated above; k+l and j+k+l are at least equal to 2, k/(j+l) is comprised between 0.01 and 1000, l/j is comprised between 0.01 and 100; T is one of the terminals mentioned above;

(e) T—O—(CF$_2$ (CF$_2$)$_z$CF$_2$O)$_s$—
wherein s is an integer such as to give the molecular weight indicated above, z has the meaning defined above and T is one of the terminals cited above;

(f) T—O(CR$_4$R$_5$CF$_2$CF$_2$O)$_{j'}$—
wherein R$_4$ and R$_5$ are equal to or different from each other and chosen among H, Cl or perfluoroalkyl, for instance having 1–4 carbon atoms, j' being an integer such that the molecular weight is the one indicated above;

(g) T—O(CF(CF$_3$)CF$_2$O)$_{j''}$— j" being an integer such as to give the molecular weight indicated above.

These compounds and the methods for preparing them are described in patents GB 1,104,482, U.S. Pat. No. 3,242,218, U.S. Pat. No. 3,665,041, U.S. Pat. No. 3,715,378 and U.S. Pat. No. 3,665,041, EP 148,482 and U.S. Pat. No. 4,523,039, U.S. Pat. No. 5,144,092.

The preferred perfluoropolyethereal radicals of the present invention have the following structures:

and

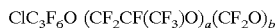

wherein the a/b ratio ranges from about 20 to about 40, and $R_{f'}$ has the meaning defined above.

An object of the present invention is therefore an aqueous latex having high viscosity and wetting capacity of a tetrafluoroethylene polymer containing at least 0.1% by weight of a non-ionic compound having the general formula (I) reported above wherein $R_1, R_2$, n, L, L', $R_f$ and $R_{f'}$ have the meaning reported above.

The non-ionic compound having formula (I) reported above can be added to the aqueous latex in amounts generally comprised between 0.1 and 20%. The amount useful to achieve the targeted viscosity depends on the latex composition and particularly on the polymer type, and on the presence of other additives. So, for instance in the case of thermoplastic copolymers latexes based on tetrafluoroethylene, perfluoromethylvinylether and/or one or more fluorinated monomers, also of the type of fluorodioxoles, such amount ranges between 0.2 and 10% by weight. The presence in the same latex of a conventional non-fluorinated non-ionic surfactant, such as, polyethoxylated alcohols wherein the alkyl ranges from 3 to 30 carbon atoms and the ethoxy ranges from 2 to 40 carbon atoms, for instance octyl-phenoxy-polyethoxyethanol changes such range towards higher concentrations, such as for instance between 0.9 and 10% by weight. In the case of PTFE latexes additivated with the same conventional surfactant cited above, the range of the thickener of the invention ranges between 0.2 and 10%.

Among the tetrafluoroethylene copolymers are comprised in particular:

A) modified polytetrafluoroethylene containing small amounts, generally comprised between 0.01 and 3% by moles, preferably comprised between 0.05% and 0.5% by moles, of one of more comonomers such as, for instance, perfluoropropene, perfluoroalkylperfluorovinylethers, vinylidenefluoride, hexafluoroisobutene, chlorotrifluoroethylene, perfluoroalkylethylenes;

B) tetrafluoroethylene (TFE) thermoplastic copolymers containing from 0.5 to 8% by moles of at least a perfluoroalkylvinylether, where the perfluoroalkyl radical has from 1 to 6 carbon atoms, such as for instance the TFE/perfluoropropylvinylether, TFE/perfluoromethylvinylether, TFE/perfluoroethylvinylether, TFE/perfluoroalkylethylene copolymers; alternatively to perfluoroalkylvinylether, a fluorodioxole can be used, preferably as defined hereafter in D) 3); TFE amorphous copolymers with fluorodioxoles, preferably as defined hereinunder, the amounts of fluorodioxole can range between 40–95% by moles.

C) tetrafluoroethylene thermoplastic copolymers containing 2 to 20% by moles of a perfluoroolefin $C_3$–$C_8$, such as, for instance, the TFE copolymer/hexafluoropropene, to which small amounts (lower than 5% by moles) of other comonomers having perfluorovinylether structure can be added (as described, for instance, in U.S. Pat. No. 4,675,380);

D) tetrafluoroethylene thermoplastic copolymers containing 0.5 to 13% by weight of perfluoromethylvinylether and 0.05 to 5% by weight of one or more fluorinated monomers chosen from the group formed by:

1) $R_FO$—$CF=CF_2$ (II)

wherein $R_F$ can be:

i) a perfluoroalkyl containing from 2 to 12 carbon atoms;

ii) 

wherein r is comprised between 1 and 4 and r' is zero or comprised between 1 and 3;

iii) 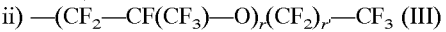

wherein the units (OCFX) and ($OCF_2$—CFY) are randomly distributed along the chain; T, X and Y have the same meaning previously defined;

Z represents —(CFX)— or —($CF_2$—CFY)—;

q and q', equal to or different from each other, are zero or integers comprised between 1 and 10;

the average numerical molecular weight of the monomer is comprised between 200 and 2,000.

iv) 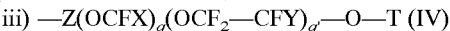

wherein W is —Cl, —F or —$CF_3$ and t and t' are zero or integers comprised between 1 and 5;

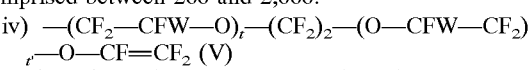

(VI)

wherein u is zero or an integer comprised between 1 and 4;

2) $R_F$—CH=$CH_2$(VII)

wherein $R_F$ has the meaning described in 1);

3) a perfluorodioxole of formula:

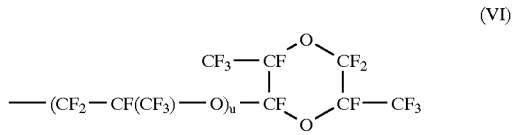

(VIII)

wherein $R_3$ is a perfluoroalkyl radical $C_1$–$C_5$; $X_1$ and $X_2$ are, independently the one from the other, a fluorine atom or —$CF_3$, preferably both $X_1$ and $X_2$ are fluorine atoms.

The preferred weight ratio of the three classes of monomers forming the thermoplastic copolymers tetrafluoroethylene/perfluoromethylvinylether/fluorinatedmonomers (D) is the following:

perfluoromethylvinylether: 2–9%;

fluorinated monomers: 0.1–1.5%;

tetrafluoroethylene: complement to 100%.

Among the comonomers of formula (II), perfluoroethylvinylether, perfluoropropylvinylether and perfluorobutylvinylether can for instance be mentioned. The preferred comonomer of this class is perfluoropropylvinylether.

The comonomers of formula (III) are described, for instance, in the published European patent application No. 75,312. Examples of these comonomers are those in which r can be 1 or 2 and r' is 2.

The comonomers of formula (IV) are obtained by dechlorination of the compounds having the formula:

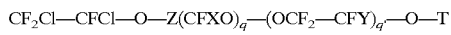

which can be prepared as described in example 11 of U.S. Pat. No. 4,906,770.

The comonomers of class (V) can be prepared according to the British patent 1,106,344. Among these comonomers the compound:

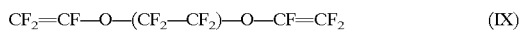 (IX)

can be mentioned.

The comonomers of the class (VI) can be prepared according to the procedure described in the U.S. Pat. No. 4,013,689.

In the comonomers of formula (VII) $R_F$—CH=CH$_2$, the radical $R_F$ preferably contains from 2 to 6 carbon atoms. Examples of these comonomers are perfluorobutylethylene and perfluorohexylethylene.

The fluorinated comonomers 1–3 described above can be copolymerized with TFE and perfluoromethylvinylether alone to give terpolymers or in combination with each other to give tetrapolymers or copolymers having a higher constituent complexity.

The tetrafluoroethylene copolymers can be prepared by radical polymerization in aqueous medium. It results particularly convenient to carry out the polymerization in aqueous phase according to European patent application 247,379, or, preferably, as described in U.S. Pat. No. 4,864, 006.

The concentration of the latex obtained by polymerization is generally comprised between 20 and 50% by weight and its viscosity is typically of a few centipoises, such as for instance 5–10 centipoises.

The latex can be further concentrated by means of the techniques of the art, for instance by utilizing conventional non-ionic surfactants, such as for instance octylphenoxypolyethoxyethanol, known in trade by the commercial name of Triton® X 100 sold by Union Carbide.

The essential feature of the compound having general formula (I) resides in that it allows to obtain acceptable results of thickening and wetting capacity with very reduced concentrations, that are typically lower than those deriving from the the separate use of a thickening and a wetting agent.

In agreement with what reported in the art on the rheology of non fluorinated systems (for instance: Th. F. Tadros et al; Langmuir 1995, 11, 4678–4684), the variation of the viscosity of the formulated latexes, depending on the concentration of the thickening compound having the general formula (I), generally shows a viscosity maximum corresponding to a fixed additive concentration. At higher concentrations the viscosities progressively decrease down to values which are comparable to those of the non-additivated latexes. The skilled in the art can easily determine the optimal amount to obtain the desired thickening.

The viscosity increase of the additivated latexes and the concentration of thickener necessary to have the maximum increase of viscosity are correlated to all the parameters which are known to influence the viscosity of latexes; such as, for instance, the particle concentration, the particle sizes, the ionic strength, the presence of other surfactants, etc. Such parameters are, for instance, summarized in: Th. F. Tadros; Colloids and Surfaces, 18 (1986) 137–173.

As an example, it is possible to increase the viscosity of a polytetrafluoroethylene (PTFE) latex containing 60% by weight of polymer, 3.5% by weight of Triton®-X100, 0.04% by weight of ammonium perfluoro-octanoate, from 14.2–17 to over 1000 centipoises (at 35° C.) by addition of 0.3% by weight of a compound having general formula (I). The same concentration of compound (I) reduces the surface tension of water from 72 mN/m to 24.5 mN/m. Such surface tension allows to wet all the typical substrates to be coated.

The addition of the compound of general formula (I) having thickening, wetting or surface-active action to the aqueous latex of the tetrafluoroethylene polymer is carried out under mild stirring and at room temperature.

The additive is added as such or in the form of aqueous solution. In such solutions the concentration of additive in water is comprised between 20 and 90% by weight.

The viscosity of the latexes, at a temperature comprised between 25 and 40° C., has been measured with a Brookfield Syncro-lectric viscometer Mod. LVT equipped with four rotors numbered from 1 to 4.

The measurements have been carried out after about one hour from the preparation of the samples.

As the angular speed of each rotor influences the measured viscosity value, the kind of rotor and the rotating speed have been chosen according to the routinely procedures for Brookfield viscosity measurements, depending on the characteristics of each sample.

The measurements of surface tension of the aqueous solutions of the compounds having general formula (I) have been carried out at 25° C. by means of a Lauda TElC tensiometer, according to ASTM D1331-89.

The following examples are described with the purpose of better understand the present invention and are not limitative anyway of the scope of the present invention.

EXAMPLES 1–6

An aqueous latex of a copolymer of class B), with molar percentages of TFE and FMVE respectively of 96.5 and 3.5 was utilized. The average diameter of the polymer particles was about 170÷180 nm.

The latex had been initially concentrated with 3% by wt of hydrogenated non-ionic surfactant Triton-X100® (Röhm & Haas), up to a polymer concentration of the 52% by weight.

Weighted aliquots of the latex were then diluted with water and additivated with different amounts of a 90% by weight aqueous solution of:

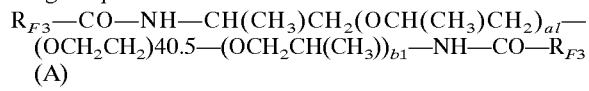
(A)

wherein: a1+b1=2.5 and
$R_{F3}$ is $R_{F2}O$ $(CF_2CF(CF_3)O)_{n'}(CF(CF_3)O)_p(CF_2O)_{m'}CF_2$
$R_{F3}$ has an average molecular weight=650 and $R_{F2}$ is perfluoroalkyl from 1 to 3 carbon atoms.

The wetting compound (A) allows to lower the surface tension of the water from 72 mN/m, at 25° C., up to the values reported hereinafter:

| Concentration (g/l) | Surface tension at 25° C. (mN/m) |
|---|---|
| 0.10 | 35.50 |
| 0.10 | 27.00 |
| 1.00 | 24.80 |

As shown in the following Table, the samples of latex additivated with (A) display a remarkable increase of viscosity:

| Example | latex (g) | 90% solut. A (g) | water (g) | polymer % by wt. | A % by wt. | Triton % by wt. | rotor | speed (rpm) | Brookfield viscosity at 25° C. Brookfield viscosity (cP) |
|---|---|---|---|---|---|---|---|---|---|
| 1 | 250 | — | — | 52.0 | — | 3.0 | 1 | 60 | 9 |
|   |     |   |   |      |   |     | 1 | 30 | 6 |
| 2 | 250 | — | 27.5 | 46.8 | — | 2.7 | 1 | 60 | 8 |
|   |     |   |      |      |   |     | 1 | 30 | 5–6 |
| 3 | 250 | 1.38 | 26.12 | 46.8 | 0.45 | 2.7 | 1 | 60 | 9 |
|   |     |      |       |      |      |     | 1 | 30 | 5–6 |
| 4 | 250 | 2.75 | 24.75 | 46.8 | 0.90 | 2.7 | 1 | 12 | 230 |
|   |     |      |       |      |      |     | 1 | 6 | 280 |
|   |     |      |       |      |      |     | 1 | 3 | 288 |
| 5 | 180 | 4.0 | 15.8 | 46.8 | 1.8 | 2.7 | 2 | 30 | 915 |
|   |     |     |      |      |     |     | 2 | 12 | 1270 |
|   |     |     |      |      |     |     | 2 | 6 | 1800 |
|   |     |     |      |      |     |     | 3 | 60 | 860 |
|   |     |     |      |      |     |     | 3 | 30 | 1000 |
|   |     |     |      |      |     |     | 3 | 12 | 1400 |
| 6 | 180 | 9.9 | 9.9 | 46.8 | 4.5 | 2.7 | 3 | 12 | 6150 |
|   |     |     |     |      |     |     | 3 | 6 | 7000 |

EXAMPLES 7–8

The latex used here contained a terpolymer of TFE-FMVE-FPVE in molar ratio 96.15:3.5:0.35 and has been prepared according to the process described in example 1 of European patent 633,274. The average diameter of the polymer particles was about 70 nm. The latex had a concentration of 30.5% by weight of polymer.

82.3 g of latex were diluted with water and additivated with 14.4 g of a 90% by weight aqueous solution of the same surfactant A of examples 1–6 and with 3% by weight of hydrogenated non-ionic surfactant Triton-X100®.

The values of Brookfield viscosity of the obtained sample are compared below, in identical test conditions, to those of the latex without the additive:

| Example | 90% solut. A (g) | water (g) | polymer (% by wt.) | A (% by wt.) | rotor | speed (rpm) | Brookfield viscosity Viscosity at 25° C. (cP) |
|---|---|---|---|---|---|---|---|
| 7 | — | 57.7 | 17.4 | — | 1 | 60 | 4 |
|   |   |      |      |   | 1 | 30 | 3–4 |
| 8 | 14.4 | 43.3 | 17.4 | 9 | 1 | 60 | 69 |
|   |      |      |      |   | 1 | 30 | 65 |
|   |      |      |      |   | 1 | 12 | 63 |

EXAMPLE 9

Example 8 was repeated but using the terpolymer having the following composition: 95:3.5:1.5.

The results are similar to those of Ex. 8.

EXAMPLES 10–14

The same latex of example 7 was additivated with the solution (90 or 20% by weight in water) of the surfactant (A) and water, to enable the concentration of (A) and the polymer to be suitable for comparative purposes, for instance, comparing different amount of additive of the same polymer concentration or vice-versa.

The compositions of the samples and their viscosities values are reported in the following table:

| Example | latex (g) | 20%–90% solut. in A (g) | water (g) | polymer % by wt. | A % by wt. | rotor | speed (rpm) | Brookfield viscosity (cP) at 25° C. |
|---|---|---|---|---|---|---|---|---|
| 10 | 130 | — | — | 30.5 | — | 1 | 60 | 7 |
|    |     |   |   |      |    | 1 | 30 | 5 |
| 11 | 141 | 0.64(90%) | 2.3 | 29.9 | 0.40 | 4 | 30 | 9400 |
|    |     |           |     |      |      | 4 | 12 | 5000 |
| 12 | 82.3 | 2.9(20%) | 59.1 | 17.4 | 0.40 | 4 | 6 | 13500 |
|    |      |          |      |      |      | 4 | 3 | 22000 |
| 13 | 82.3 | 4.3(20%) | 59.12 | 17.4 | 0.60 | 3 | 12 | 2000 |
|    |      |          |       |      |      | 3 | 6  | 3800 |
| 14 | 82.3 | 6.5(20%) | 55.5 | 17.4 | 0.9 | 3 | 12 | 2000 |
|    |      |          |      |      |     | 3 | 6  | 3700 |

EXAMPLES 15–16

The same terpolymer latex of Example 7 was diluted with water and additivated with different amounts of a 20% by weight solution of surfactant Al having general structure similar to compound A, but with:

$R_{F3}$ having average molecular weight=500;
$R_{F2}=ClC_3F_6—$

As compound A, Al allows to lower the surface tension of the water

| Concentration (g/l) | Surface tension at 25° C. (mN/m) |
|---|---|
| 0.01 | 35.5 |
| 0.1  | 29.7 |
| 1.0  | 25.8 | and it has thickening action as it results from the following table.

| Example | latex (g) | 20% Al solut. (g) | water (g) | polymer % by wt. | Al % by wt. | rotor | speed (rpm) | Brookfield viscosity at 25° C. Brookfield viscosity (cP) |
|---|---|---|---|---|---|---|---|---|
| 15 | 62.3 | 4.3 | 57.7 | 17.4 | 0.60 | 3 | 30 | 1480 |
|    |      |     |      |      |      | 3 | 12 | 4700 |
| 16 | 82.3 | 6.5 | 55.5 | 17.4 | 0.90 | 4 | 30 | 4000 |
|    |      |     |      |      |      | 4 | 12 | 7000 |
|    |      |     |      |      |      | 4 | 6  | 14000 |

EXAMPLES 17–21

The latex used here has been obtained by a polymerization process analogous to that of the latex of example 7, but it has a concentration of dry polymer of 19.3% by weight.

The latex was diluted with water and additivated with different aliquots of a 90% by weight solution of surfactant A, obtaining samples having the composition and viscosity reported hereinafter:

| Example | latex (g) | 90% Al solut. (g) | water (g) | polymer % by wt. | A % by wt. | rotor | speed (rpm) | Brookfield viscosity at 25° C. Brookfield viscosity (cP) |
|---|---|---|---|---|---|---|---|---|
| 17 | 130 | —    | 14.3 | 17.4 | —    | 1 | 60 | 4 |
| 18 | 130 | 0.72 | 13.6 | 17.4 | 0.45 | 2 | 60 | 90 |
|    |     |      |      |      |      | 2 | 30 | 100 |

-continued

| | | | | | | Brookfield viscosity at 25° C. | |
| Example | latex (g) | 90% Al solut. (g) | water (g) | polymer % by wt. | A % by wt. | rotor | speed (rpm) | Brookfield viscosity (cP) |
| --- | --- | --- | --- | --- | --- | --- | --- | --- |
| 19 | 130 | 1.43 | 12.9 | 17.4 | 0.90 | 4 | 6 | 5000 |
| 20 | 130 | 7.15 | 7.15 | 17.4 | 4.50 | 1 | 60 | 8 |
|    |     |      |      |      |      | 1 | 30 | 5 |
| 21 | 130 | 14.3 | —    | 17.4 | 9.0  | 1 | 60 | 16–17 |
|    |     |      |      |      |      | 1 | 30 | 14–15 |

EXAMPLES 22–27

A PTFE commercial latex (Algoflon® D60PS) was used.

The latex, consisting of particles having an average length of 0.35 μm and an average width comprised between 0.08–0.14 μm and having a dry concentration of 32% by weight, was concentrated with Triton®-X100.

The final composition of the latex was: 70.14% by weight of dry polymer; 2.13% by weight of Triton®-X100 and 0.05% by weight of ammonium perfluorooctanoate (PFOA).

The latex was then diluted with water and additivated with further amounts of Triton®-X100, a 10% by weight ammoniacal solution, and a 90% by weight aqueous solution of the wetting agent A previously defined.

The samples with pH=9 and with constant polymeric concentration (60% by weight), Triton®-X100 (3.5%), PFOA (0.04%) have different content of surfactant A and variable viscosity, as reported in the following table:

| Example | A % by weight | Brookfield viscosity measurements | | | | |
| --- | --- | --- | --- | --- | --- | --- |
| | | rotor | speed (rpm) | Brookfield viscosity (cP) | | |
| | | | | T = 25° C. | T = 35° C. | T = 40° C. |
| 22 | — | 1 | 60 | 19.5 | 15.5 | 14.8 |
|    |   | 1 | 30 | 20   | 14.2 | 12 |
|    |   | 1 | 12 | 17   | 17   | 14 |
| 23 | 0.2 | 1 | 60 | 30 | — | — |
|    |     | 1 | 30 | 33 | — | — |
|    |     | 1 | 12 | 37 | — | — |
|    |     | 1 | 6  | 46 | 310 | — |
|    |     | 2 | 60 | —  | 170 | — |
|    |     | 2 | 30 | —  | 195 | 480 |
|    |     | 2 | 12 | —  | 250 | 712 |
|    |     | 2 | 6  | —  | 325 | 1025 |
|    |     | 2 | 3  | —  | —   | 1600 |
| 24 | 0.3 | 1 | 30 | 104 | — | — |
|    |     | 1 | 12 | 135 | — | — |
|    |     | 1 | 6  | 150 | — | — |
|    |     | 2 | 60 | 175 | — | — |
|    |     | 2 | 30 | 180 | — | — |
|    |     | 2 | 12 | 212 | — | — |
|    |     | 2 | 6  | —   | 2600 | — |
|    |     | 2 | 3  | —   | 4000 | — |
|    |     | 3 | 60 | —   | 1000 | — |
|    |     | 3 | 30 | —   | 1440 | — |
|    |     | 3 | 12 | —   | 2150 | — |
|    |     | 3 | 6  | —   | 2700 | — |
| 25 | 0.5 | 3 | 30 | 2620 | 2200 | 2240 |
|    |     | 3 | 12 | 3450 | 2000 | 1650 |
|    |     | 3 | 6  | 3100 | 2100 | 2500 |
|    |     | 3 | 3  | 4000 | — | — |
|    |     | 4 | 60 | 2250 | — | — |
|    |     | 4 | 30 | 2300 | — | — |
| 26 | 0.6 | 3 | 12 | — | 1950 | — |
|    |     | 3 | 6  | — | 2300 | — |
|    |     | 4 | 30 | — | 700  | — |
|    |     | 4 | 12 | — | 1000 | — |
| 27 | 0.9 | 3 | 30 | — | 2560 | — |
|    |     | 3 | 12 | — | 2250 | — |
|    |     | 3 | 6  | — | 2500 | — |
|    |     | 4 | 60 | — | 1300 | — |
|    |     | 4 | 30 | — | 960  | — |
|    |     | 4 | 12 | — | 1100 | — |

EXAMPLES 28–29

A PTFE latex (Algoflon® D60PS) concentrated with Triton®-X100 was utilized.

The latex contained particles having an average length of 0.35 μm and an average width comprised between 0.08–0.14 μm.

The latex composition was: 63.75% by weight of dry polymer; 1.95% by weight of Triton®-X100 and 0.05% by weight of ammonium perfluoro-octanoate.

200 g of latex were diluted with water and additivated with a 90% by weight solution of the wetting agent A previously defined. The final concentration of Triton®-X100 in each sample was of 1.75% by weight.

The composition of the samples and their viscosity values are reported in the following table:

| Example | A 90% solut. (g) | water (g) | PTFE (%) | A (%) | rotor | speed (rpm) | Brookfield viscosity (cP) T = 35° C. |
| --- | --- | --- | --- | --- | --- | --- | --- |
| 28 | — | 22 | 57.4 | — | 1 | 60 | 11 |
|    |   |    |      |   | 1 | 30 | 8 |
| 29 | 2.2 | 19.8 | 57.4 | 0.9 | 2 | 6 | 1650 |
|    |     |      |      |     | 3 | 60 | 1120 |
|    |     |      |      |     | 3 | 30 | 1160 |
|    |     |      |      |     | 3 | 12 | 1100 |

EXAMPLES 30–33

The same PTFE concentrated latex of Examples 28–29 was used.

The latex was diluted with water and additivated with further amounts of Triton®-X100, a 10% by weight ammonia solution to control pH and a 90% by weight aqueous solution of the wetting agent Al previously defined.

All the samples had constant concentration of PTFE (60% by weight), Triton®-X100 (3.5% by weight), PFOA (0.04% by weight).

The content of wetting agent Al and the viscosity values of each sample are reported in the following table:

| Example | Conc. A1 (% by weight) | rotor | speed (rpm) | Brookfield viscosity (cP) T = 25° C. | Brookfield viscosity (cP) T = 35° C. |
|---|---|---|---|---|---|
| 30 | 0 | 1 | 60 | 26 | 22 |
|  |  | 1 | 30 | 28 | 22 |
|  |  | 1 | 12 | 28 | 24 |
| 31 | 0.3 | 1 | 6 | 630 | — |
|  |  | 2 | 60 | 315 | — |
|  |  | 2 | 30 | 370 | 730 |
|  |  | 2 | 12 | 525 | 1175 |
|  |  | 2 | 6 | 725 | 1850 |
| 32 | 0.6 | 2 | 6 | 3900 | — |
|  |  | 3 | 60 | 1300 | 1280 |
|  |  | 3 | 60 | 1740 | — |
|  |  | 3 | 12 | 2800 | 3300 |
|  |  | 3 | 6 | 4000 | 5100 |
| 33 | 1.0 | 3 | 10 | 3120 | — |
|  |  | 3 | 12 | 5300 | 4950 |
|  |  | 1 | 6 | 7600 | — |

EXAMPLES 34–36

Samples of terpolymer latex having a composition analogous to that of Example 7, with 17.4% by weight of polymer and with different amounts of the wetting agent and thickener A previously defined, were employed for dripping tests on glass slides for optical miscroscopy.

The glass slides (sizes 76×26×1 mm), cleaned with acetone and subsequently weighed, were immersed for 5 minutes in each latex sample and then dried in vertical position at room temperature (about 20° C.) for 16 hours.

The polymer deposition onto each slide was determined by the weight increase with respect to the initial weight of the uncoated slide.

The results reported in the following table show the amount of polymer onto the coated slide to progressively be enhanced by the latex viscosity:

| Example | Ref. prep. previous examples | A % by wt. | Average Brook. visc. 25° C. (cP) | Deposited amount (g) | Increase wt. % |
|---|---|---|---|---|---|
| 34 | 17 | 0.00 | 4 | 0.038 | 0 |
| 35 | 18 | 0.45 | 95 | 0.150 | 295 |
| 36 | 19 | 0.90 | 5000 | 0.915 | 2300 |

EXAMPLES 37–39

Samples of copolymer latex having a composition similar to that of examples 2–4, with 46.8% by weight of polymer and with different amounts of the wetting agent and thickener A previously defined were employed for dripping tests on aluminium plates.

The aluminum plates (sizes 7.5×15×0.05 cm), cleaned and weighed, were placed on a support having a constant inclination of about 60°. A known amount (20 ml) of the latex was deposited horizontally at the upper edge of the plate all along its width, allowing the dripping.

The treated plate was dried on the same support at room temperature (about 20° C.) for 16 hours. The deposited amount of polymer was determined by the difference by weight with respect to the uncoated plate.

The results reported in the following table display the increase of the amount deposited as the latex viscosity rises:

| Example | Ref. prep. previous ex. | A % by wt. | Average Brook. viscosity 25° C. (cP) | Deposited amount (g) | increase wt. % |
|---|---|---|---|---|---|
| 37 | 2 | 0.00 | 6.5 | 0.127 | 0 |
| 38 | 3 | 0.45 | 7.5 | 0.150 | 18 |
| 39 | 4 | 0.90 | 259 | 0.220 | 73 |

We claim:

1. A non-ionic compound having the general formula:
$$R_f — L — (OCHR_1 — CHR_2)_n — O — L' — R_{f'} \quad (I)$$
wherein:

n is an integer comprised between 4 and 60;

and are equal to or different from each other, and are selected from the group consisting of:

$-(CFY-CO-O)_p R'-$ and $-(CFY-CO-NH)_p R'-$
wherein: p is 0 or 1; Y is F or $CF_3$; R' is an alkyl radical $C_1-C_5$, $R_1$, $R_2$ is both H or the former H and the latter $CH_3$;

$R_f$ and $R_{f'}$ are equal to or different from each other, are perfluoropolyether radicals having a number average molecular weight comprised between 250 and 1500.

2. The compound according to claim 1, wherein the perfluoropolyether radicals $R_f$ and $R_{f'}$ comprise a terminal T and repeating units statistically distributed along the chain of the polymer selected from the group consisting of:

—$CF_2CFXO$— or $CFXO$—, wherein X is equal to F or —$CF_3$;

—$CF_2(CF_2)_zO$— wherein z is an integer equal to 2 or 3;

—$CF_2CF(OR_f'')O$— and —$CF(OR_f'')O$— wherein $R_f''$ is $CF_3$, —$C_2F_5$, or $C_3F_7$ and the terminal T is selected among —$CF_3$, —$C_2F_5$, —$C_3F_7$, $ClCF_2CF(CF_3)$—, $CF_3CFClCF_2$—, $ClCF_2$— and $ClCF_2$—.

3. The compound according to claim 1, wherein the perfluoropolyether radicals $R_f$ and $R_{f'}$ are selected from the group consisting of:

(a) T—O $(CF_2CF(CF_3)O)_a(CFXO)_b$—
wherein: X is F or $CF_3$; a and b are integers such that the molecular weight is comprised in the range indicated above; a/b is comprised between 10 and 100, and T is one of the terminals mentioned in claim 2;

(b) T—O$(CF_2CF_2O)_c$ $(CF_2O)_d(CF_2(CF_2)_zCF_2O)_h$—
wherein: c, d and h are integers such that the molecular weight is comprised in the range indicated above; c/d is comprised between 0.1 and 10; h/(c+d) is comprised between 0 and 0.05, z is an integer equal to 2 or 3, and T is one of the terminals mentioned in claim 2;

(c) T—O$(CF_2CF(CF_3)O)_e(CF_2CF_2O)_f(CFXO)_g$—
wherein: X is F or $CF_3$; e, f, g are integers such that the molecular weight is comprised in the range indicated above; e/(f+g) is comprised between 0.1 and 10, f/g is comprised between 2 and 10, T is one of the terminals mentioned in claim 2;

(d) T—O$(CF_2O)_j(CF_2CF(OR_f'')O)_k(CF(OR_f'')O)_l$—
wherein: $R_f''$ is —$CF_3$, —$C_2F_5$, —$C_3F_7$; j,k,l are such integers that the molecular weight is comprised in the range indicated above; k+l and j+k+l are at least equal to 2, k/(j+l) is comprised between 0.01 and 1000, l/j is comprised between 0.01 and 100; T is one of the terminals mentioned in claim 2;

(e) T—O—$(CF_2(CF_2)_zCF_2O)_s$—
wherein s is an integer such as to give the molecular weight indicated above, z has the meaning defined above and T is one of the terminals cited above;

(f) T—O(CR$_4$R$_5$CF$_2$CF$_2$O)$_{j'}$—
wherein R$_4$ and R$_5$ are equal to or different from each other and chosen among H, Cl or perfluoroalkyl, for instance having 1–4 carbon atoms, j' being an integer such that the molecular weight is the one indicated above;

(g) T—O(CF(CF$_3$)CF$_2$O)$_{j''}$—
j'' being an integer such as to give the molecular weight indicated above.

4. The compound according to claim 1, wherein the perfluoropolyether radicals R$_f$ and R$_{f'}$ are selected the group consisting of:

$$R_{f'}—O—(CF_2CF(CF_3)O)_a(CF_2O)_b$$

and $$ClC_3F_6O\ (CF_2CF(CF_3)O)_a(CF_2O)_b$$

wherein the a/b ratio ranges from about 20 to about 40, and R$_{f'}$ has the meaning defined above.

5. A method of using the non ionic compound of formula (I) according to claim 1, as thickening and wetting or surface-active agent of aqueous latexes containing a tetrafluoroethylene polymer or a copolymer thereof.

6. An aqueous latex having high viscosity and wetting capacity of a tetrafluoroethylene polymer containing at least 0.1% of a non-ionic compound of general formula (I) according to claim 1.

7. Aqueous latex according to claim 6, wherein the amount of the non-ionic compound of formula (I) is comprised between 0.1 and 20%.

8. Aqueous latex according to claim 6, wherein the amount of the non-ionic compound is comprised between 0.2 and 10% by weight when the tetrafluoroethylene polymer is a thermoplastic copolymer based on tetraluoroethylene, perfluoromethylvinylether and one or more fluorinated monomers.

9. Aqueous latex according to claim 8, wherein the amount of the non-ionic compound is comprised between 0.9 and 10% by weight when the tetrafluoroethylene polymer is a thermoplastic copolymer based on tetrafluoroethylene, perfluoromethylvinylether and one or more fluorinated monomers and a conventional non-ionic surfactant is present.

10. Aqueous latex according to claim 6, wherein the tetrafluoroethylene polymer or a copolymer thereof is selected from polytetrafluoroethylene (PTFE) and its copolymers with one or more fluorinated comonomers radically copolymerizable with tetrafluoroethylene.

11. Aqueous latex according to claim 10, wherein the tetrafluoroethylene copolymer is chosen from:

A) modified polytetrafluoroethylene containing amounts, comprised between 0.01 and 3% by moles, of one or more comonomers selected from the group consisting of perfluoropropene, perfluoroalkylperfluorovinylethers, vinylidenefluoride, hexafluoroisobutene, chlorotrifluoroethylene, and perfluoroalkylethylenes;

B) terafluoroethylene (TFE) thermoplastic copolymers containing from 0.5 to 8% by moles of at least a perfluoroalkylvinylether, wherein the perfluoroalkylic radical has from 1 to 6 carbon atoms; alternatively to the perfluoroalkylvinylether, a fluorodioxole is used; TFE amorphous copolymers with fluorodioxoles the amounts of fluorodioxole ranges between 40–95% by moles;

C) tetrafluoroethylene thermoplastic copolymers containing from 2 to 20% by moles of a perfluoroolefin C$_3$–C$_8$, to which amounts lower than 5% by moles of other comonomers having perfluorovinylethereal structure are optionally added;

D) tetrafluoroethylene thermoplastic copolymers containing from 0.5 to 13% by weight of perfluoromethylvinylether and from 0.05 to 5% by weight of one or more fluorinated monomers selected from the group consisting of:

1) R$_F$O—CF=CF$_2$ (II)
wherein R$_F$ can be:
i) a perfluoroalkyl radical containing from 2 to 12 carbon atoms:
ii) (CF$_2$—CF(CF$_3$)—O))$_r$—(CF$_2$)$_{r'}$—CF$_3$(III)
wherein r is comprised between 1 and 4 and r' is zero or comprised between 1 and 3:
iii) —Z(OCFX)$_q$(OCF$_2$—CFY)$_{q'}$—O—T IV
wherein the units (OCFX) and (OCF$_2$—CFY) are randomly distributed along the chain; T, X and Y have the same meaning previously defined; Z represents —(CFX)— or —(CF$_2$—CFY)—; q and q', equal to or different from each other, are zero or integers comprised between 1 and 10; the number average molecular weight of the monomer is comprised between 200 and 2,000,
iv) —(CF$_2$—CFW—O)$_t$—(CF$_2$)$_2$—(O—CFW—CF$_2$)$_{t'}$—O—CF=CF$_2$(V)
wherein W is —Cl, —F or —CF$_3$ and t and t' are zero or integers comprised between 1 and 5;

$$\text{—(CF}_2\text{—CF(CF}_3\text{)—O)}_u\text{—CF}\underset{O}{\overset{O}{\diagdown\diagup}}\text{CF—CF}_3\cdots\text{CF}_3\text{—CF}\underset{O}{\overset{O}{\diagdown\diagup}}\text{CF}_2\text{—CF—CF}_3 \quad (VI)$$

wherein u is zero or an integer comprised between 1 and 4;

2) R$_F$CH=CH$_2$(VII)
wherein R$_F$ has the meaning described in 1);

3) a perfluorodioxole of formula:

$$\underset{O\diagdown_{CX_1X_2}\diagup O}{\text{CF}=\text{C—OR}_3} \quad (VIII)$$

wherein R$_3$ is a perfluoroalkyl radical C$_1$–C$_5$; X$_1$ and X$_2$ are, independently one from the other, a fluorine atom or —CF$_3$.

12. Aqueous latex according to claim 11, wherein the thermoplastic copolymer tetrafluorbethylene/perfluoromethylvinylether/fluorinated monomers (D) is formed by:

perfluoromethylvinylether: 2–9%;
fluorinated monomers 0.1–1.5%;
tetrafluoroethylene: complement to 100%.

13. Aqueous latex according to claim 12, wherein the fluorinated monomer is perfluoropropylvinylether.

14. The non-ionic compound of formula I wherein n is an integer comprised between 8 and 30 and R$_f$ and R$_{f'}$ are perfluoropolyether radicals having a number average molecular weight comprised between 400 and 1000.

15. Aqueous latex according to claim 11 wherein the tetrafluoroetheylene thermoplastic copolymer contains a perfluoroalkylvinylether selected from the group consisting of TFE/perfluoropropylvinylether, TFE/perfluoromethylvinylether, TFE/perfluoroethylvinylether, TFE/perfluoroalkylethylene co-polymers and TFE amorphous copolymers with perfluorodioxoles.

16. The aqueous latex of claim 11 wherein the tetrafluoroetheylene thermoplastic copolymer containing a perfluoroalkylvinylether is TFE copolymer/hexafluoropropene.

* * * * *